US006800725B2

(12) United States Patent
Hofman et al.

(10) Patent No.: US 6,800,725 B2
(45) Date of Patent: Oct. 5, 2004

(54) PROCESS FOR REMOVING HYDROGENATION CATALYST RESIDUE FROM HYDROGENATED POLYMERS

(75) Inventors: Andrianus Hendrick Hofman, Amsterdam (NL); Heleen Johanna Augusta De Smet, Amsterdam (NL); Alan Villena, Amsterdam (NL); Anne Genevieve Charlotte Wirtz, Amsterdam (NL)

(73) Assignee: KRATON Polymers U.S. LLC, Houston, TX (US)

( * ) Notice: Subject to any disclaimer, the term of this patent is extended or adjusted under 35 U.S.C. 154(b) by 0 days.

(21) Appl. No.: 10/203,142

(22) PCT Filed: Feb. 9, 2001

(86) PCT No.: PCT/EP01/01511

§ 371 (c)(1), (2), (4) Date: Dec. 3, 2002

(87) PCT Pub. No.: WO01/58965

PCT Pub. Date: Aug. 16, 2001

(65) Prior Publication Data

US 2003/0139569 A1 Jul. 24, 2003

(30) Foreign Application Priority Data

Feb. 11, 2000 (EP) ............................................. 00301081

(51) Int. Cl.[7] .................................................. C08F 6/00
(52) U.S. Cl. ........................ 528/480; 502/164; 528/481; 528/482
(58) Field of Search ................................. 528/480, 481, 528/482; 502/164

(56) References Cited

U.S. PATENT DOCUMENTS

| 3,113,986 A | 12/1963 | Breslow et al. |
| 3,130,237 A | 4/1964 | Wald |
| 3,202,647 A | 8/1965 | Todd et al. |
| 3,205,218 A | 9/1965 | Arbuckle et al. |
| 3,700,633 A | 10/1972 | Wald et al. |
| 3,700,748 A | 10/1972 | Winkler |
| 3,756,977 A | 9/1973 | Yoshimoto et al. |
| 3,780,138 A | 12/1973 | Hassell et al. |
| 3,801,520 A | 4/1974 | Hogan et al. |
| 3,987,006 A | 10/1976 | Kitchen et al. |
| 4,028,485 A | 6/1977 | Poloso et al. |
| 4,396,761 A * | 8/1983 | Willis et al. ................ 528/487 |
| 4,403,074 A | 9/1983 | Moczygemba |
| 4,471,099 A | 9/1984 | Trepka |
| 6,465,609 B2 * | 10/2002 | Ko et al. .................... 528/490 |

FOREIGN PATENT DOCUMENTS

| EP | 0 731 111 B1 | 2/1999 |
| JP | 3-49281 | 4/1991 |
| JP | 6-55772 | 1/1994 |
| JP | 7-64889 | 10/1995 |
| JP | 2002356509 | * 12/2002 |
| WO | 99/05185 | 4/1999 |
| WO | 00/12570 | 3/2000 |

* cited by examiner

Primary Examiner—Terressa Boykin

(57) ABSTRACT

This invention relates to a process for removing hydrogenation catalyst residue from hydrogenated polymers comprising:

(I) treating a polymer cement comprising an unsaturated polymer in an inert water-immiscible liquid with a hydrogen source in the presence of a hydrogenation catalyst;

(II) contacting the polymer cement of step (I) with one or more aqueous solution(s) of a weak acid having a pKa greater than 1.5 (determined in water at 25° C.);

(III) contacting the polymer cement of step (II) with one or more aqueous solution(s) of a weak base having a pKa smaller than 10.5; and (IV) separating the hydrogenated polymer.

20 Claims, No Drawings

PROCESS FOR REMOVING HYDROGENATION CATALYST RESIDUE FROM HYDROGENATED POLYMERS

BACKGROUND OF THE INVENTION

1. Field of the Invention

This invention relates to a process for removing hydrogenation catalyst residue from hydrogenated polymers.

2. Background of the Art

Unsaturated polymers are hydrogenated for a variety of reasons, frequently using a nickel catalyst. The presence of olefinic double bonds in the polymers makes them susceptible to oxygen attack and to deterioration by actinic radiation; saturation of olefinic double bonds greatly improves environmental stability and may improve color. For example, U.S. Pat. No. 3,130,237, suggests hydrogenating unsaturated compounds by the use of certain cobalt complexes. U.S. Pat. No. 3,205,218 teaches hydrogenation of olefinic compounds utilizing a complex of a nickel or cobalt compound with certain aluminum reactants. U.S. Pat. No. 3,113,986 is related and suggests hydrogenation in the presence of the reaction products of certain metal alkoxides with aluminum trialkyls. U.S. Pat. No. 3,595,942 teaches selective hydrogenation of block copolymers with reaction products of aluminum trialkyls and metal alkoxides or carboxylates. Finally, there is a great number of references on other hydrogenation catalysts.

A common problem shared by all types of hydrogenated polymers is the deleterious effect of catalyst residues remaining after hydrogenation. The quantity of metal residues to be removed may be as high as 5% wt. Nickel, for example, discolors the product and may cause polymer deterioration. It must therefore be removed almost completely.

One typical method employed in the art to remove catalyst residue is by mixing a solution or emulsion of polymer (so-called polymer cement) with an aqueous solution of an acid, usually a mineral acid. For instance, U.S. Pat. No. 4,396,761 describes a (prior art) process of removing catalyst residue by treating the polymer cement with dilute sulfuric acid, separating the aqueous phase, and contacting the polymer-containing phase with live steam to drive off the polymer solvent and convert the polymer into polymer crumb. It also describes a process wherein an alpha-hydroxysulfonic acid is used instead of the dilute sulfuric acid, and wherein the polymer crumbs so produced are then subjected to a heat treatment that removes the alpha-hydroxysulfonic acid residues.

The use of dilute hydrochloric acid and water is described in U.S. Pat. No. 3,634,549.

U.S. Pat. No. 4,028,485 describes a process for removing hydrogenation catalyst residue from solutions of hydrogenated polymers by treatment with non-aqueous acid followed by neutralization with anhydrous base and filtration.

U.S. Pat. No. 3,756,977 discloses the removal of solvent and catalysts from hydrogenated polymers by contacting the reaction mixture with a polar solvent containing a small amount of acid, followed by pouring the reaction mixture into hot water and removing the solvent by azeotropic distillation.

U.S. Pat. Nos. 4,403,074, 3,987,006 and 3,801,520 describe a carbon dioxide/water treatment of hydrogenated polymers.

Unfortunately, it has been found that hydrogenated polymers so prepared are slightly yellow or turn yellow upon use. This is believed to be caused by interaction of remaining acid with later added antioxidants. However, mere addition of soda or ammonia, to neutralize the acid is ineffective, or will even aggravate the problem, due to the fact that the antioxidant ester links can be hydrolyzed at low and high pH, thus forming color bodies.

SUMMARY OF THE INVENTION

It is therefore an object of the present invention to provide hydrogenated polymers that do not suffer from discoloration.

We have found that hydrogenated polymers may be made that are essentially colorless (yellowness index of no more than 15, measured according to ASTM E313-73). Accordingly, we provide a process for removing hydrogenation catalyst residue from hydrogenated polymers comprising:

(I) treating a polymer cement comprising an unsaturated polymer in an inert water-immiscible liquid with a hydrogen source in the presence of a hydrogenation catalyst;

(II) contacting the polymer cement of step (I) with one or more aqueous solution(s) of a weak acid having a pKa greater than 1.5 (determined in water at 25° C.);

(III) contacting the polymer cement of step (II) with one or more aqueous solution(s) of a weak base having a pKa smaller than 10.5; and (IV) separating the hydrogenated polymer.

DETAILED DESCRIPTION OF THE PREFERRED EMBODIMENTS

We have discovered that essentially colorless hydrogenated polymers may be produced when the residue of the hydrogenation catalysts are separated from the polymer cement by treating the latter with an aqueous solution of an inorganic acid having a pKa (relative to water) in the range of 1.5 to about 7, such as $SO_2$ or $CO_2$, preferably in the range of 4 to about 7 such as $NaH_2PO_4$, followed by the treatment with an aqueous solution of a weak base having a pKa in the range of about 7 to 10.5, such as $NaHCO_3$.

There are two embodiments to the process of the present invention. In one embodiment, the aqueous phases resulting from the treatment with the aqueous acid solution and aqueous base solution are left with the organic phase until final separation. This embodiment is ideal when cost considerations are at least as important as product quality. In this embodiment, preferably the acid and base are used at relatively high concentration. In the other embodiment, the treated polymer cement is allowed to settle and be separated from the aqueous layer. This may be done in a conventional settler, in a coalescer or by any other means. The invention is further described in respect of this preferred embodiment.

The aqueous acid solution may have a pH of at least 4 to 7, whereas the aqueous base solution may have a pH of at most 9 to 7.

The amount of acid is an amount in excess of the molar amount of metal(s) to be removed. The concentration is not critical, but in general, from 0.01 to 1 normal solutions are acceptable. Preferably, acidic aqueous solutions having concentrations in the range of from 0.1 to 0.5 N are used.

The polymer cement being contacted with the aqueous acid solution is preferably also contacted with an oxidizing agent. The oxidizing agent can be a stream of oxygen in nitrogen. About three molar percent oxygen in nitrogen is preferred. Other oxidation agents, such as peroxides, may also be used.

Mixing of the polymer cement with the aqueous acid solution is also important. Mixing with an impeller having a tip speed of greater than about 5 m/sec results in sufficient contact between the aqueous solution and the cement to result in effective removal of the metal(s). Of course, types of mixing other than by impeller may be used. For instance, a rotary dispersing unit having an interlocked structure ("CAVITRON" or "SUPRATRON") as described in Japanese patent No. 95064889 may be used, or any of the stirring blade-equipped container type mixers, static mixers, homomixers and other such line mixers described in chapter 19 of Perry's Chemical Engineers' Handbook.

The polymer cement may be contacted with the aqueous acid solution in a volumetric ratio in the range of 0.001 to 1.0. This treatment may be carried out once, or—as is known to be more effective—a number of times. The purpose of this is to remove the hydrogenation catalyst residue until the level wherein it is no longer objectionable from a toxicological or polymer stability point of view. This would therefore also depend on the nature of the hydrogenation catalyst that is used.

Next, the polymer cement is treated with an aqueous solution of a weak base. Weak bases within the meaning of the present invention are the conjugated bases of the aforementioned inorganic acids. An example of a suitable weak base is NaHCO3, but NaHSO3 and/or Na2HPO4 may also be used.

Generally a single treatment with the aqueous base solution suffices, although two or more treatments with aqueous base solution may be carried out. The amount of base to be used depends on the amount of acid remaining in the polymer. Preferably the amount is in the range of 0.5 to 1.5 moles, more preferably 0.8 to 1.2 moles per mole acid. Again, the concentration of the aqueous base solution is not critical, with from 0.01 to 10 normal solutions being acceptable, and from 0.1 to 0.5 normal solutions being preferred.

In addition to the treatments with aqueous acid solution(s) and with aqueous base solution(s), one or more water washing steps may be introduced. The water layer so produced is preferably removed in the manner described herein before.

It is hypothesized that small droplets of aqueous acid solution and/or aqueous base solution remain entrained in the polymer cement, and cause the yellowing of the recovered polymer. In the present process, these droplets still exist. However, neither the weak acid nor the weak base is strong enough to react or cause reaction of the added antioxidants.

An additional advantage of using a combination of weak acid and weak base is the avoidance of special grade steel for the reaction vessels, and/or the relaxation of temperature constrains in case special grade steel is already used. The latter is advantageous in that it permits the processing of more concentrated polymer cements (that are ordinarily too viscous), thus providing a substantive cost reduction.

The process of the invention may be used in respect of the hydrogenation of any unsaturated polymer. The polymer of the present invention is preferably a polymer derived by anionic polymerization of a diene, a mixture of dienes, or a mixture of one or more dienes with copolymerizable monomer(s) such as styrene and other vinyl aromatics. Of particular commercial interest are block copolymers based on styrene and butadiene and/or isoprene. These block copolymers exhibit thermoplastic elastomeric properties.

Polymers that are prepared by anionic polymerization and that are then hydrogenated, are typically hydrogenated in the solution or suspension (so-called polymer cement) in which they are polymerized. Such polymer cements therefore contain the metal ions used in the anionic polymerization as well, frequently at high concentrations. However, the process of the present invention also successfully removes said metal residues.

Polymer hydrogenation catalysts useful in the present invention have been mentioned above. For instance, they include nickel alkoxide or carboxylates, such as 2-ethyl-1-hexanoates reduced with aluminum alkyl compounds. These hydrogenation catalysts are disclosed in, for example, U.S. Pat. Nos. 3,700,633 and 3,700,748.

The hydrogenation may be carried out with a hydrogen partial pressure of between 0.1 and 10 MPa. More typically, the hydrogen partial pressure is between 0.7 and 8.3 MPa. The amount of hydrogenation catalyst may vary from 0.001 to 10 g per kg polymer. Hydrogenation can be carried out at temperatures of between 25° C. and 100° C. The time of hydrogenation under such conditions will typically be between 0.1 and 4 hours, achieving greater than 90 percent hydrogenation of the initial olefinic unsaturation.

The hydrogenated polymer is typically stabilized by the addition of an antioxidant or mixture of antioxidants. Frequently, a phosphorus-based stabilizer is used in combination with a sterically hindered phenolic stabilizer, such as disclosed in Japanese patent No. 94055772; or a combination of phenolic stabilizers is used, such as disclosed in Japanese patent No. 94078376.

Finally, the hydrogenated polymer may be isolated and recovered by a variety of techniques. The polymer may be isolated in the form of crumbs, using the technology disclosed in U.S. Pat. No. 3,202,647 or disclosed in EP patent appl. No. 731,111; by use of a cyclone separator as disclosed in U.S. Pat. Nos. 3,804,15 and 3,968,003; or by use of a devolatilizing extruder (vented extruder) as is disclosed for instance in Japanese patent No. 91049281.

EXAMPLES AND COMPARATIVE EXAMPLES

The following examples are provided to illustrate the present invention. The examples are not intended to limit the scope of the present invention and they should not be so interpreted. Amounts are in weight parts or weight percentages unless otherwise indicated.

Experiments were performed using a styrene-butadiene-styrene block copolymer that had a 68 percent by weight butadiene monomer content and a 32 percent by weight styrene monomer content and had a polystyrene equivalent molecular weight of 280,000. The copolymer was prepared in a solution of cyclohexane, using sec-butyllithium as an initiator, and sequential addition of the styrene and butadiene monomers to achieve polymerization of triblocks. After polymerization was complete, methanol was added to terminate the polymers.

The final polymer cement contained 9 percent by weight polymer, and 44 ppm by weight lithium.

Hydrogenation was accomplished using a catalyst prepared by adding to the polymer cement nickel 2-ethyl-1-hexanoate reacted with triethylaluminum in a 2.2:1 molar ratio of aluminum to nickel and 250–450 ppm by weight of nickel. Hydrogen partial pressure was applied to the cement for a time period of 3.5 hours. The cement was maintained under a nitrogen blanket after hydrogenation was complete and samples of 1.5–2.5 kg of polymer cement were subjected to extraction under varying conditions to demonstrate the present invention.

The extractions were performed in a five liter glass extraction vessel. The vessel contained two disk mixers equipped with 6 flat blades of 6.25 cm diameter each, and four baffles of each 1.27 cm located every 90 degrees around the inside circumference of the vessel. The pressure during extraction was maintained at less than 0.2 MPa at various temperatures. A 0.8:1 volumetric ratio of acid solution to polymer cement was added to the cement. The mixer was immediately started and the components were mixed for 30 minutes at 820 rpm. A 3 percent by volume mixture of oxygen in nitrogen was bubbled through the cement at a rate of 2–4 L/hr. At the end of 80 minutes, the mixer and oxygen/nitrogen addition was stopped and the contents were allowed to phase separate for 20 minutes. The aqueous phase was fully drained from the extraction vessel. A polymer cement sample was then taken.

In the process according to the invention this process was repeated with addition of a small amount of an aqueous base solution.

The amount of nickel in the polymer was determined by inductively coupled plasma/mass spectroscopy (ICP/MS). The TABLE below lists the acid and base used in the removal of catalyst residue and the nickel concentration prior and after the acid wash. All of the ppm values are based on dry polymer weight. The Yellowness Index is determined after addition of a suitable antioxidant and recovery of polymer crumbs by steam stripping.

TABLE

| Run No. | Acid | Base | Temp. °C. | Ni prior to wash ppm | Ni after wash ppm | Y.I. |
|---|---|---|---|---|---|---|
| A | $H_2SO_4$ (0.5%) | $NH_3$ | 74 | 259 | 12 | 17 |
| B | $H_2SO_4$ (0.5%) | $NaHCO_3$ | 90 | 462 | 10 | 18 |
| C | $NaH_2PO_4$ | $NaHCO_3$ | 74 | 329 | 44 | 11 |
| D | $NaH_2PO_4$ | $NaHCO_3$ | 90 | 262 | 16 | 11 |
| E | $NaH_2PO_4$ | $NaHCO_3$ | 110 | 340 | 13 | 11 |
| F | $SO_2$ (aq) | $NaHCO_3$ | 90 | 461 | 33 | 15 |
| G | $CO_2$ (aq) |  | 74 | — | — | 16 |

Examples A, B and G are comparative examples, using either a too strong acid (A, B) or lacking a treatment with a weak base (G).

It can be seen from the TABLE that examples of the present invention, Samples C, D, E, and F, and in particular Samples C, D and E, resulted in acceptable removal of catalyst residue and acceptable yellowness index by the one stage extraction process.

What is claimed is:

1. A process for removing metal residue from hydrogenated polymers comprising:
   (I) hydrogenating a polymer cement comprising an unsaturated polymer in an inert water-immiscible liquid with a hydrogen source in the presence of a hydrogenation catalyst;
   (II) contacting the polymer cement of step (I) with one or more aqueous solution(s) of a weak acid having a pKa greater than 1.5;
   (III) contacting the polymer cement of step (II) with one or more aqueous solution(s) of a weak base having a pKa less than 10.5; and
   (IV) separating the aqueous solutions from the polymer cement.

2. The process of claim 1, wherein the weak acid of the one or more aqueous solution(s) of a weak acid is selected from inorganic acids having a pKa in the range of 1.5 to 6.5.

3. The process of claim 2, wherein the weak acid is selected from the group comprising NaH2PO4, SO2, and CO2.

4. The process of claim 1, wherein the weak base of the one or more aqueous solution(s) of a weak base is the conjugated base of an inorganic acid having a pKa in the range of 7.5 to 10.5.

5. The process of claim 4, wherein the weak base is selected from the group comprising NaHCO3, NaNSO3 and Na2HPO4.

6. The process of claim 1, wherein the amount of weak acid is an amount in excess of the molar amount of metal residue.

7. The process of claim 1, wherein the aqueous weak acid solution has a concentration of from 0.01 to 1.0 N.

8. The process of claim 1, wherein the polymer cement being contacted with the aqueous weak acid solution is also contacted with an oxidizing agent.

9. The process of claim 8, wherein the oxidizing agent is a stream of oxygen in nitrogen.

10. The process of claim 1, wherein the weak base is used in an amount relative to the amount of acid in the polymer cement in the range of 0.5 to 1.5 mole/mole.

11. The process of claim 10, wherein the weak base is used in an amount relative to the amount of acid in the polymer cement in range of 0.8 to 1.2 mole/mole.

12. The process of claim 1, wherein the concentration of the aqueous weak base solution is in the range from 0.01 to 10 N.

13. The process of claim 1, further comprising one or more water washing steps.

14. The process of claim 1, wherein the unsaturated polymer is prepared by anionic polymerization of a diene, a mixture of dienes or a mixture of one or more dienes with copolymerizable monomers.

15. The process of claim 14, wherein the copolymerizable monomers are selected from the group comprising styrene, butadiene, and isoprene.

16. The process of claim 15, wherein the copolymerizable monomer is styrene.

17. The process of claim 1, wherein the hydrogenation is carried out using a nickel- or cobalt-based hydrogenation catalyst.

18. The process of claim 17, wherein the hydrogenation is carried out with a hydrogen partial pressure of between 0.1 and 10 MPa, a hydrogenation catalyst in an amount of between 0.001 to 10 g per kg polymer, and at temperatures of between 25° C. and 100° C.

19. The process of claim 18, wherein the hydrogenated polymer is stabilized by the addition of an antioxidant or mixture of antioxidants.

20. A hydrogenated polymer prepared using the method of claim 13.

* * * * *